March 21, 1939.  G. E. DE VOE ET AL  2,151,195

STOVE HANDLE

Filed June 20, 1938

Inventors
George Earl DeVoe
Vennice E. Mark
By Liananee and
Van Antwerp
Attorneys Patented Mar. 21, 1939

2,151,195

UNITED STATES PATENT OFFICE 2,151,195

STOVE HANDLE

George Earl De Voe, Grand Rapids, and Vennice E. Mark, Grandville, Mich., assignors to Winters & Crampton Corporation, Grandville, Mich., a corporation of Michigan Application June 20, 1938, Serial No. 214,734

8 Claims. (Cl. 16—111)

This invention relates to handles which are particularly adapted for attachment to the doors of ovens in stoves and the like; though of course the handle may be readily applied and connected to any door which is to be opened and closed, drawers and the like.

It is an object and purpose of the present invention to construct a handle of several parts, two of which are substantial duplicates of each other and with an intermediate member of thin metal between, the parts of the handle being assembled by merely placing them together, being held in their assembled and operative relation to each other when connected to the door and wherein, when the handle is used on ovens, there is a protection to the hand of the one grasping the handle to open or close the door through a shield interposed so that no parts of the hand of the operator come into engagement with a high temperature oven door. A further object of the invention is to provide a handle in which the several parts thereof are interlocked together when assembled and connected to the door so that there will be no change of position or lost motion of an intermediate member with respect to the two parts at the ends thereof. A still further object of the invention is to provide a handle structure which may be readily manufactured in large quantity production economically so as to be commercially available.

Many other objects and purposes than those stated will be described in the follwing specification of the structure shown in the accompanying drawing, in which.

Like reference characters refer to like parts in the different figures of the drawing.

Figure 1:
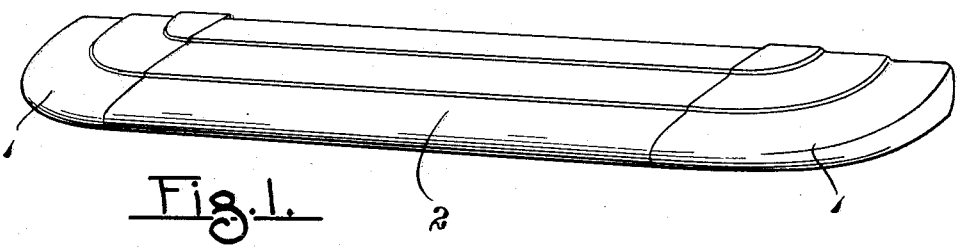
Fig. 1 is a perspective view of the handle, looking downwardly thereon and from the front.

In the construction of the handle two ends 1 and an intermediate sheet metal member 2 are provided, the two end members being adapted to be placed at the ends of the intermediate member and assembled therewith in interlocked relation.

The end members 1 may be of any suitable material of sufficient solidity and strength. In practice we have made such end members of Bakelite. Each member is in the form of a quadrant and is of an appreciable thickness and at its inner end and adjacent the outer curved portion thereof is provided with an integral lug 3 (Fig. 5) while the adjacent end portion of said member is recessed as at 4 and an intermediate solid part 5 of the member is provided with a threaded opening for reception of attaching screws in connecting said end member to the door on which the handle is to be mounted.

Figure 5:
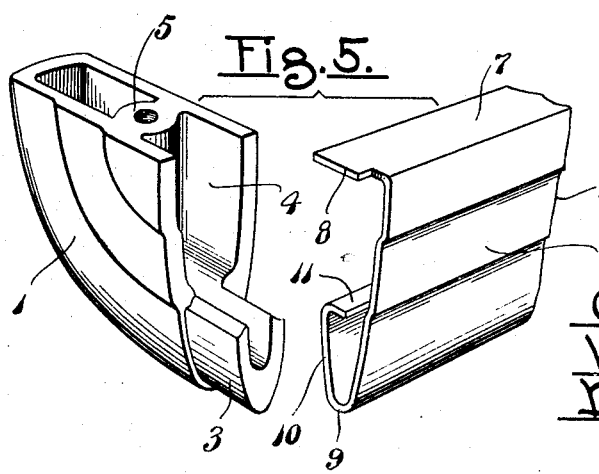
Fig. 5 is a perspective view of one end part of the handle and the adjacent portion of the intermediate member, the parts being separated as before assembly.

The intermediate member 2 of sheet metal has an upper face 6 from the inner edge of which a flange 7 is bent substantially at right angles. The flange 7 at each end is provided with a short extension or lug 8, the width of which is equal substantially to the distance between the inner sides of the recess at 4. At its opposite edge the face 6 is bent in a reverse bend at 9, continued in a section 10 which terminates in a flange 11 bent back toward the face portion 6 (Fig. 5). The shape of the bead thus made corresponds to the shape of the lug 3 whereby said lug may be entered into one end of said bead and the end member brought against the end of the intermediate member 2, with the lug 8 entering the recess at 4. The outer and upper face 6 of the intermediate part of the handle may be shaped in accordance with any desired design and the continuing adjacent faces of the end members 1 shaped to correspond with such design as indicated in the drawing.

Figure 3:
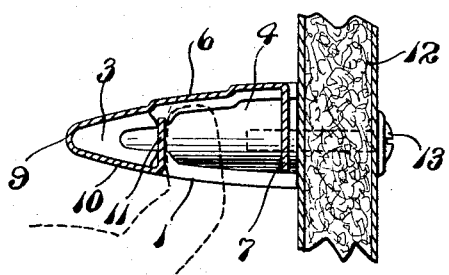
Fig. 3 is a vertical section between the ends of the handle and showing the same attached to a stove or oven door.
Figure 2:
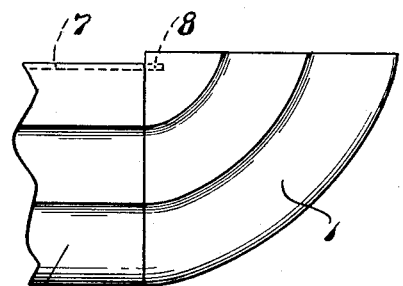
Fig. 2 is a plan view of one end of the handle.
Figure 4:
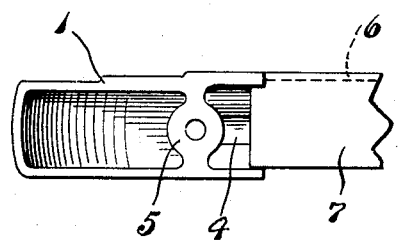
Fig. 4 is an inside elevation of one end of the handle.

With the two end members assembled with the intermediate member by inserting the lugs 3 into the return-bent bead described, and with the parts 8 received within the recesses at 4, the handle may be attached to an oven door, as 12, by passing screws 13 from the inner side of the door through the door and thence into the threaded opening of the portion 5 of each end 1. The handle in such position is located horizontally (Fig. 3) with the flange 7 spaced a short distance from the outer vertical side of the door 12. The handle is grasped by inserting the fingers underneath the outer bead, comprised of the parts 9, 10, 11 and the front portion of the upper face 6, and the fingers brought against the flange 11 and in the space between said flange 11 and the flange 7. The flange 7 serves as a shield or guard against the fingers coming against the door 12 which may be at a relatively high degree of temperature. The projections 8 of the flange 7 seating within the recesses at 4 firmly lock the parts against movement with respect to each other. It is to be understood that the outer dimensions of the lugs 3 are such that when inserted within the bead at the outer edge portions of the intermediate member 2 they fit therein with a snug fit and sufficiently tight that the parts will not fall apart so that they retain their positions with respect to each other until the ends 1 are secured to the oven door in the manner described.

The construction described is very simple and practical and provides a very useful construction of handle particularly for doors like oven doors which may be heated to high degrees of temperature. The appearance of the handle may be made very attractive. The structure is one which lends itself to economy in production and to large quantity production.

The invention is defined in the appended claims and is to be considered comprehensive of all forms of structure coming within their scope.

We claim:

1. A handle comprising end members spaced apart from each other, and an intermediate elongated member between the end members having a flange turned inwardly at its inner edge and provided with finger engaging means at its outer portion whereby the fingers may engage said handle underneath the upper side of said intermediate member and between said finger engaging means and said flange, as specified.

2. A handle comprising spaced apart end members, an intermediate member extending horizontally between the end members, said end members at their ends adjacent the intermediate member being recessed and said intermediate member having a flange turned substantially at right angles at its inner edge, said flange having end projections extending into said recesses of the end members, and said intermediate member being provided with a downwardly and inwardly turned finger engaging bead longitudinally thereof at its outer portion.

3. A construction containing the elements in combination defined in claim 2, each of said end members having a lug extending therefrom into said bead, as specified.

4. A handle for attachment to a vertical support, said handle comprising two spaced apart end members secured to said support and a horizontal intermediate member of sheet metal between the end members and connected therewith, the upper side of said intermediate member being substantially flush with the upper sides of said end members, and said intermediate member having a flange substantially at right angles to the body thereof at the inner edge of said body, said flange being spaced a short distance from the vertical side of the support, and said intermediate member at its outer portion having a downwardly and inwardly formed bead extending lengthwise thereof between said end members, for the purposes specified.

5. A construction containing the elements in combination defined in claim 4, each of said end members having a lug projecting therefrom into the bead portion of said intermediate member and also adjacent said support having a recess at its inner side, said flange on the intermediate member having a projection at each end entering said recesses in the end members, the widths of said projections being substantially the same as the widths of said recesses.

6. A handle comprising, two spaced apart end members and an elongated intermediate member of sheet metal extending between, the upper side of said intermediate member being substantially flush with the upper sides of said end members, said intermediate member at its inner edge portions having a flange turned substantially at right angles thereto and lying longitudinally between said end members, and at its outer portion being return bent upon itself to form a finger engaging portion which extends the full length of the intermediate member, and means for connecting said end and intermediate members together and holding the same against movement with respect to each other.

7. A handle for attachment to a vertical support, said handle comprising two spaced apart end members and a horizontal elongated intermediate member between said end members, means for connecting said end members to the support, said intermediate member being of sheet metal and having an upper side substantially flush with the upper sides of the end members, means for telescopically connecting the end and intermediate members at the adjacent ends thereof and at the outer portions of said members, said intermediate member having a flange integral therewith extending between said end members substantially parallel to and spaced a short distance from said vertical support.

8. A construction containing the elements in combination defined in claim 7, said flange at the ends thereof having means interlocking with the end members when telescopically connected to the intermediate member.

GEORGE EARL DE VOE.
VENNICE E. MARK.